United States Patent [19]
Seiler

[11] Patent Number: 5,687,837
[45] Date of Patent: Nov. 18, 1997

[54] EYEGLASS RETAINER AND PROTECTIVE COVER

[76] Inventor: Douglas A. Seiler, 127 Iolanthus Ave., Novato, Calif. 94947

[21] Appl. No.: 602,591

[22] Filed: Feb. 16, 1996

Related U.S. Application Data

[63] Continuation-in-part of Ser. No. 375,500, Jan. 19, 1995, abandoned.

[51] Int. Cl.⁶ ................................................. A45C 11/04
[52] U.S. Cl. ................................................. 206/5; 351/156
[58] Field of Search ............................. 206/5, 6, 37, 38; 351/155, 156, 157

[56] References Cited

U.S. PATENT DOCUMENTS

| | | |
|---|---|---|
| 2,481,946 | 9/1949 | Pendleton . |
| 2,539,922 | 1/1951 | Nyberg . |
| 2,557,552 | 6/1951 | Martin . |
| 2,704,961 | 3/1955 | Weil . |
| 3,728,012 | 4/1973 | Downey . |
| 4,133,604 | 1/1979 | Fuller . |
| 4,520,510 | 6/1985 | Daigle . |
| 4,541,696 | 9/1985 | Winger . |
| 4,606,453 | 8/1986 | Burns . |
| 4,692,002 | 9/1987 | Meistrell . |
| 4,696,556 | 9/1987 | Perry, III . |
| 4,712,254 | 12/1987 | Daigle . |
| 4,811,430 | 3/1989 | Janusz . |
| 4,818,094 | 4/1989 | Lyons . |
| 4,953,695 | 9/1990 | Tallman . |
| 5,102,216 | 4/1992 | Mitchell . |
| 5,151,778 | 9/1992 | Conley . |
| 5,240,105 | 8/1993 | Tsai . |
| 5,366,072 | 11/1994 | Goldenberg . |
| 5,593,024 | 1/1997 | Seiler ............................ 206/5 |

FOREIGN PATENT DOCUMENTS

928963  6/1947  France .

*Primary Examiner*—Jacob K. Ackun
*Attorney, Agent, or Firm*—Foley & Lardner

[57] ABSTRACT

A protective device for being removably attached to a pair of eyeglasses includes a pouch into which the eyeglasses can be inserted, without removal of the attachment elements. The pouch is inverted between a retainer configuration wherein the eyeglasses are held to the head of a user and a cover configuration wherein the eyeglasses are lodged within the pouch. A positive closure permits the pouch to be closed in both the retainer and cover configurations and opened for insertion and removal of the eyeglasses.

5 Claims, 7 Drawing Sheets

EYEGLASS RETAINER AND PROTECTIVE COVER

CROSS-REFERENCE TO RELATED APPLICATION

This is a continuation-in-part of U.S. patent application Ser. No. 08/375,500, entitled Eyeglass Retainer and Protective Cover, filed on Jan. 19, 1995, and now abandoned.

BACKGROUND OF THE INVENTION

The present invention relates generally to the field of eyeglasses and more particularly to eyeglass retainers in combination with systems for protecting the glasses from loss and/or damage. Still more specifically, the present invention relates to an eyeglass retainer and protection system where the retainer element can be removably attached to the stems of the glasses and wherein the glasses can be inserted into the protective system without removal of the retainer elements.

It has been desirable for many years to retain eyeglasses around the head and/or neck of a user to prevent the glasses from inadvertently falling or to retain the glasses in a position where they can be readily placed over the eyes, e.g. for reading. Retainers are also known for maintaining the glasses in position during exercise and sport activities where it is desirable to ensure that the glasses do not become dislodged through body movement.

A number of retainer devices are shown in the patent literature, many including a band of some type with retainer elements at each end of the band adapted to fit over the end of the eyeglass stems. See, for example, U.S. Pat. No. 2,539,922 issued Jan. 30, 1951 to Nyberg for "Spectacle Neck Support"; U.S. Pat. No. 2,481,946 issued Sep. 13, 1949 to Pendleton for "Retainer For Spectacles"; U.S. Pat. No. 2,704,961 issued Mar. 29, 1955 to Weil for "Means For Supporting Spectacles; U.S. Pat. No. 3,728,012 issued Apr. 17, 1973 to Downey for "Eyeglasses With Retainer"; U.S. Pat. No. 4,133,604 issued Jan. 9, 1979 to Fuller for "Eyeglass Retainer"; U.S. Pat. No. 4,541,969 issued Sep. 17, 1985 to Winger, et al. for "Eyeglass Retainer"; U.S. Pat. No. 4,692,002 issued Sep. 8, 1987 to Meistrell for "Headband Attachable To Spectacles Frame Stems"; U.S. Pat. No. 4,696,556 issued Sep. 29, 1987 to Perry, III for "Eyeglass Retainer"; and U.S. Pat. No. 4,818,094 issued Apr. 4, 1989 to Lyons for "Eyeglass Retainer". These various patents, for the most part, feature the coupling techniques, many using an expandable, elastomeric tube which may be selectively pushed over and pulled from the stem portion of the glasses. The bands range from simple strings to more decorative styles, and several of the disclosed devices provide for a more permanent attachment of the bands to the stems.

It is also known to combine a protective device with a head or neck retainer, as is shown, for example, in U.S. Pat. No. 5,102,216 issued Apr. 7, 1992 to Mitchell for "Eyeglass Retainer And Case". In this device, a pouch is formed by double rolling a stretch fabric and sewing it in such a way that a cavity is provided to which access may be had by unrolling the double roll of the pouch. When the eyeglasses are stored, the elements used for attaching the device to the stems are removed.

Another protective device is shown in U.S. Pat. No. 4,953,695 issued Sep. 4, 1990 to Tallman for "Protective Cover For Eyeglasses". In this device, a protective cover is slidably mounted on the eyeglasses so that the cover may be pulled toward the temple when it is desired to use the glasses.

A different technique is shown in U.S. Pat. No. 2,557,552 issued Jun. 19, 1951 to Martin for "Headband". This device includes a pouch into which glasses may be inserted, the device serving as a headband when the glasses are in use. In this particular device, the headband is not attached to the glasses when the glasses are being used.

A "Convertible Headband Construction" is shown in U.S. Pat. No. 4,520,510 issued Jun. 4, 1985 to Daigle. In this device, a headband, which is secured around the head of a user by knotting, includes an area for receiving glasses frames. The device may be used either as a headband with the glasses covered or as eyeglasses with the flap in a stored position.

U.S. Pat. No. 4,606,453 issued Aug. 19, 1986 to Burns for "Eyeglasses Visor And Case" shows another technique in which the visor, which is removably attached to the stems of the glasses, can also be used as a protective cover for one side of the glasses when they are not in use. The visor also includes a pocket into which the glasses may be inserted after they are removed from the elastic elements used to couple the visor to the stems.

Another Daigle device is shown in U.S. Pat. No. 4,712,254 issued Dec. 15, 1987 and entitled "Headband And Eyepiece Combination". In this device, the glasses are of the type which may be flipped down into a use position from the headband.

Finally, U.S. Pat. No. 4,811,430 issued Mar. 14, 1989 to Janusz for "Eye Shield And Headband Combination" discloses another embodiment in which a pocket is formed for receiving eyeglasses. For use, the eyeglasses are removed from the headband and are secured in place using a loop-and-pile fastener system.

While all of the aforementioned patents provide adequate eyeglass retention and, in some cases, protection, they all suffer from one or more manufacturing or use disadvantages. For example, the disclosed devices which include some type of protective feature generally require that the protector be removed from the glasses for storage or leave the protective covering in an undesirable position during use of the glasses. A protective device which assists in retaining the glasses about the head or neck of a user which overcome such disadvantages would represent a significant advance in this art.

SUMMARY OF THE INVENTION

It is a principal object of the present invention to combine an eyeglass retainer and an eyeglass protective cover which overcomes the disadvantage of the various devices disclosed above.

Another object of the invention is to provide a protective device into which the glasses may be placed without removing the elements which couple the device to the glasses.

A further object of the invention is to provide a protective device which can also serve as a carrying case into which small personal objects may be placed when the eyeglasses are being used.

Yet another object is to provide an eyeglass protective device which also may be adjusted about the head or neck of a user.

A further object of the present invention is to provide an eyeglass retainer and protective device that has the ability to float on water and which, in the preferred embodiment, is comprised of a fabric that stretches to accommodate insertion and removal of the glasses.

How these and other features of the invention are accomplished will be described in the following Detailed Description of the Preferred Embodiment, taken in conjunction with the drawings. Generally, however, they are accomplished by providing a combination eyeglass retainer and protective cover. In the most preferred embodiments, the cover is prepared from a two-way stretchable fabric that can be placed behind the head or the neck of the user and can expand over the eyeglasses as a protective cover. The cover may be coupled to the eyeglasses using small, flexible rubber tubes or variable size loop devices which, in and of themselves, have previously been used in eyeglass retainers. The features are also accomplished by using a fabric that has the capability of stretching to expand over the eyeglasses. In the disclosed embodiments, the retainer cords or bands are sufficiently long to allow the glasses to be pushed into the cover without removal. The retainer may be used for sunglasses, safety eyeglasses, prescription eye wear, etc.

Thus, in accordance with one aspect of the invention, a device is provided for retaining and covering eyeglasses of the type having a frame for mounting lenses and a pair of stems coupled to the frame for holding the eyeglasses on the head of a user. The device includes a flexible pouch, a pair of retaining extensions, and closure members. The flexible pouch has an aperture along a first edge for receiving the eyeglasses. The pouch includes first and second portions, the first portion bordering a closed second edge and the second portion extending from the first portion and surrounding the aperture, the second portion being collapsible into the first portion to form a relatively narrow retainer configuration and removable from the first portion to form an expanded cover configuration for lodging the eyeglasses. The retaining extensions are configured for coupling to the stems of the eyeglasses. The closure members are disposed on the second portion of the pouch, and may be mated to retain the second portion within the first portion when the device is placed in the retainer configuration and to positively close the aperture to hold the eyeglasses within the pouch when the device is placed in the cover configuration.

In accordance with another aspect of the invention, a device of the type mentioned above includes a pouch, a retainer and a closure. The pouch is configured to selectively envelope the eyeglasses, and has an aperture along a first edge. The pouch is invertible between a retainer configuration wherein the eyeglasses are retained on the head or neck of a user and a cover configuration wherein the eyeglasses are inserted into the pouch through the aperture. The retainer permits attachment of the eyeglasses to the pouch. The closure is provided on the pouch adjacent to the aperture, and is selectively movable to open the aperture for inversion of the pouch during insertion or removal of the eyeglasses and to close the aperture both when the eyeglasses are not lodged within the pouch and when the eyeglasses are lodged within the pouch.

DESCRIPTION OF THE DRAWINGS

Other ways in which the features of the invention may be accomplished will become apparent to those skilled in the art after they have read and understood the present specification, taken in conjunction with the appended FIGURES, in which like reference numerals refer to like elements and in which.

DETAILED DESCRIPTION OF THE PREFERRED EMBODIMENTS

Before proceeding to the Detailed Description of the Preferred and Alternate Embodiments, several general comments can be made about the applicability and the scope of the invention. First, the glasses with which the invention may be used may be any of the wide variety known in the art, including prescription glasses, sun glasses, safety glasses and the like. Second, the illustrated techniques for attaching the protective component to the stems of the glasses are illustrative and may be interchanged without departing from the spirit and scope of the present invention.

The preferred fabric for use in the present invention is a stretchable fabric. A number of fabrics and materials have been found suitable, including silicon rubber, poly/cotton knits, nylon/lycra knits and acrylic/elastic knits. This allows the pouch to be stretched to accommodate and safely protect the glasses. For some embodiments, especially one which uses a retainer snap, such stretchability may not be required. Further, a wide variety of fabric colors and textures can be employed. The fabric should, of course, be one which does not damage the glasses. In addition, the fabric may have self-polishing characteristics as the glasses are inserted and removed. It is also within the scope of the present invention to employ fabrics which include a cellular construction or into which hollow plastic tubes or other hollow devices may be placed, so that the pouch retains a water buoyancy for use with such activities as boating and the like.

Figures 1, 2:
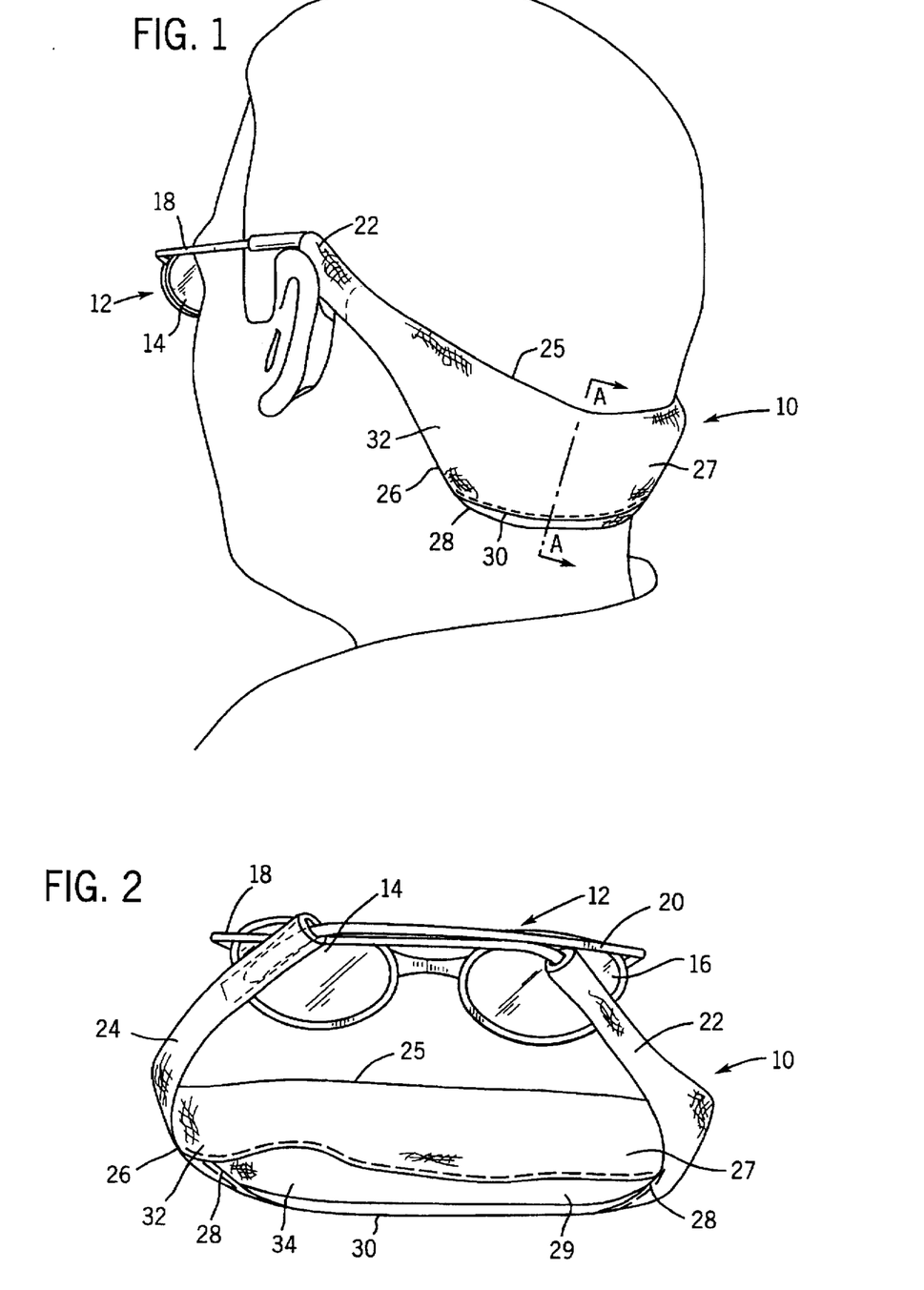
FIG. 1 is a perspective view of a retainer and protective case for eyeglasses according to one embodiment of the present invention, illustrated in a retainer configuration for holding eyeglasses on the head of a user.
FIG. 2 is a perspective view of the case shown in FIG. 1, illustrating a how the eyeglasses are folded the case is prepared for insertion of the eyeglasses therein.

Proceeding now to a description of the preferred and alternate embodiments, a retainer and protective cover 10 for eyeglasses 12 is illustrated both in a retainer configuration, in which the device retains the glasses on the head of a user, and in a cover configuration, in which the device serves as a protective storage pouch for the glasses. As shown in the FIGURES, eyeglasses 12 are of a common type, including lenses 14, 16 and a pair of stems 18, 20. As illustrated in FIGURE 1, cover 10 is adapted for attachment to stems 18, 20 and may be slipped over the head of a user, resting behind the head for holding eyeglasses 12 in place.

Cover 10 is generally hollow and tubular in construction, having open-ended retaining extensions 22 and 24 formed to be slipped over and snuggly hold stems 18 and 20 of glasses 12 as described below. Cover 10 is preferably formed of a single piece of fabric that is folded along an upper edge 25 into a tubular structure and hemmed along a lower edge 26. Alternatively, cover 10 may be formed of more than one fabric pieces, such as self-similar pieces sewn together along edges 25 and 26.

Figure 3:
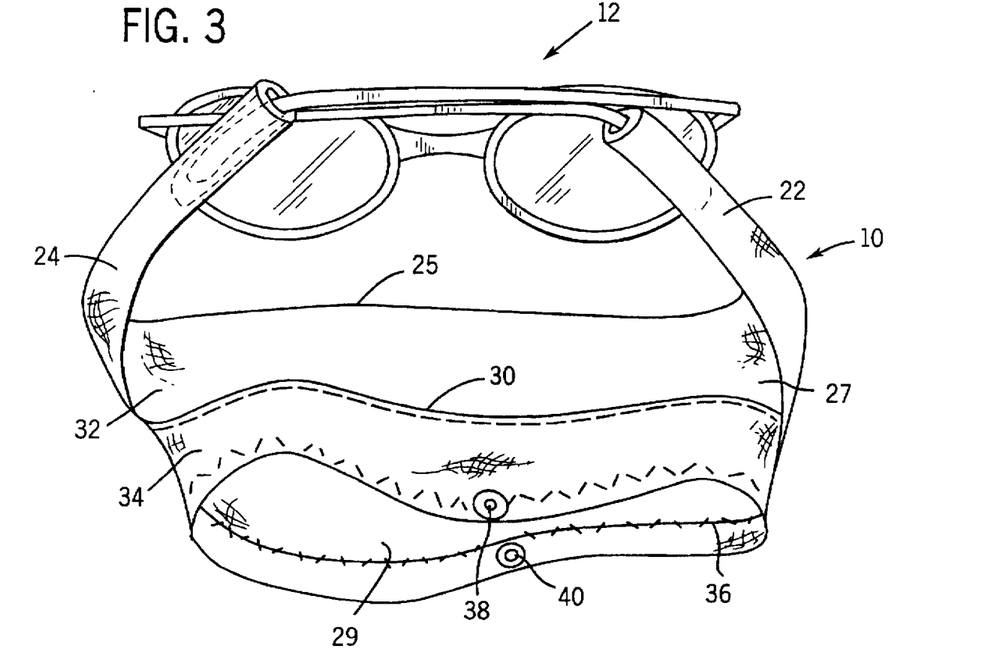
FIG. 3 is a perspective view of the eyeglass case of FIG. 1 showing how the case is unfolded into a sack or cover configuration prior to insertion of the eyeglasses therein.

As best illustrated in FIG. 3, side fabric panels of cover 10 include a broad center portion defining a pouch 27. Lower edge 26, preferably hemmed from open ends 22 and 24, follows the contour of pouch 27 and terminates at corners 28 of a central opening 29 through which eyeglasses 12 may be inserted into and removed from pouch 27. A biasing hem 30 is sewn around the periphery of pouch 27 and at about the mid-point thereof, generally continuing a line formed by lower edge 26 at the point where it intersects corners 28 of opening 29 Biasing hem 30 generally defines a bead along the outer surface of pouch 27 separating a first portion 32 of pouch 27 from a second portion 34 thereof, and tending to fold second portion 34 into first portion 32 as shown in FIG. 2. Biasing hem 30 thus forms a "soft hinge" structure along which second portion 34 is attached to first portion 32 and along which the two portions move as second portion is tucked into pouch 27 as shown in FIGS. 1 and 2, and removed therefrom as shown in FIG. 3. This feature of the invention permits case profile conveniently assume a relatively narrow profile when in the retainer configuration shown in FIG. 1, while providing an enlarged cover configuration as described more fully below.

In addition to biasing hem 30, second portion 34 of pouch 27 includes a lower border 36 formed around aperture 29. Border 36 is preferably a folded hem formed of a stretchable stitch or elastic strip tending to close or slightly constrict border 36, and thereby aperture 29. In the region of border 36, at approximately a longitudinal mid-point of pouch 27, mating closure members 38 and 40 are provided. In the preferred embodiment illustrated, closure members 38, 40 are mating snap-type closures that lie in mutually facing relation when second portion 34 of pouch 27 is folded within first portion 32, as discussed below with respect to FIG. 7. Alternatively, other mating closure devices may be utilized, such as button closures and the like.

Figure 4:
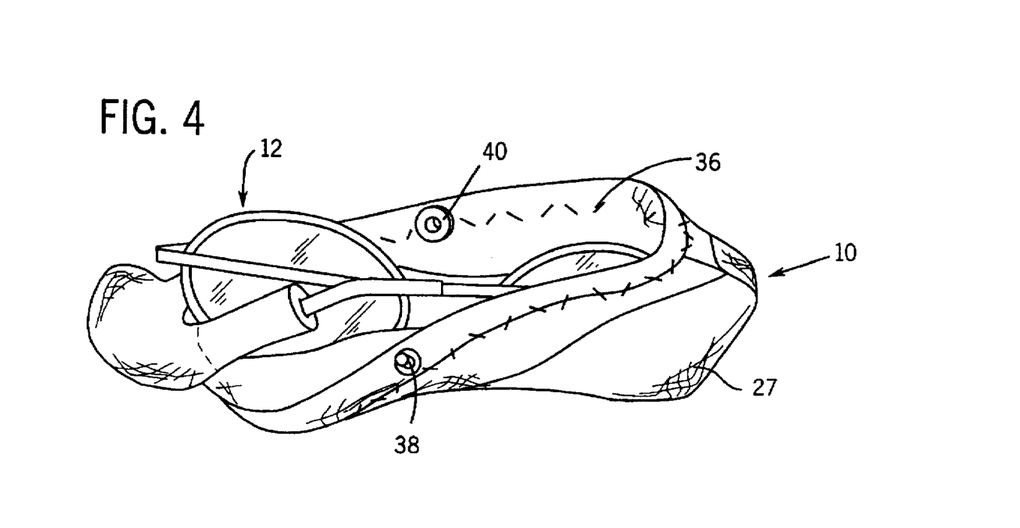
FIG. 4 is a perspective view of the case of FIG. 1, illustrating how the eyeglasses are inserted therein.
Figure 5:
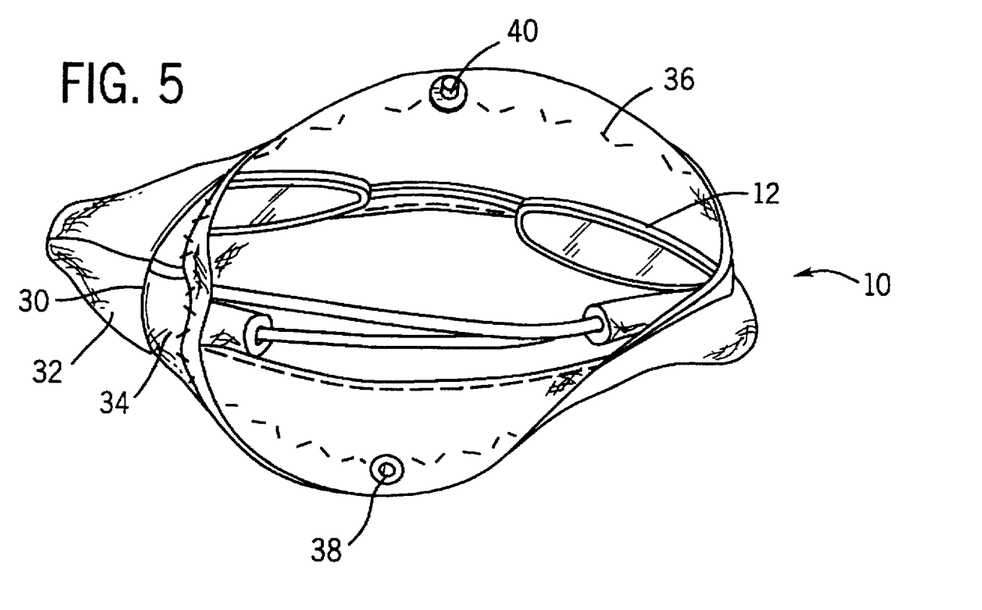
FIG. 5 is a perspective view of the case of FIG. 1, illustrating the configuration of the case when the eyeglasses have been inserted completely therein.
Figure 6:
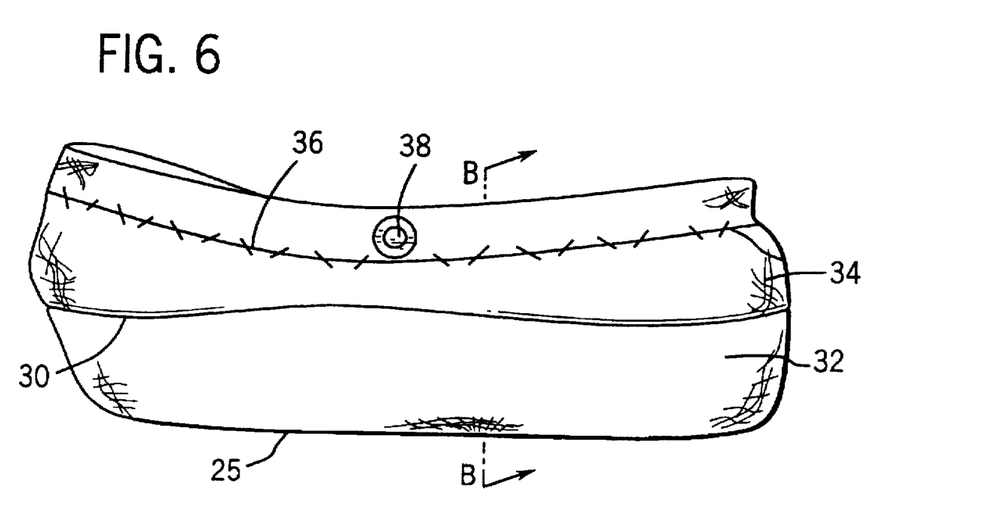
FIG. 6 is a perspective view of the case of FIG. 1 after closure of the case with the eyeglasses stored therein.

From the retainer configuration illustrated in FIGS. 1 and 2, device 10 is converted to its cover configuration as follows. First, eyeglasses 12 are folded, and closure members 38, 40 are uncoupled from one another within the folded pouch, and second portion 34 is removed or unfolded from first portion 32. Pouch 27 is then grasped in the region of aperture 29, and inverted (i.e., turned inside-out) over eyeglasses 12, stretching border 36 around eyeglasses 12 and thereby enveloping them within pouch 12 as shown in FIG. 4. As shown in FIG. 5, once eyeglasses 12 are lodged completely within inverted pouch 27, mating closure members 38, 40 will again be located in mutually facing relation. Members 38, 40 are then coupled to positively close aperture 29 and prevent eyeglasses 12 from falling or otherwise being removed from case 10.

Figure 7:
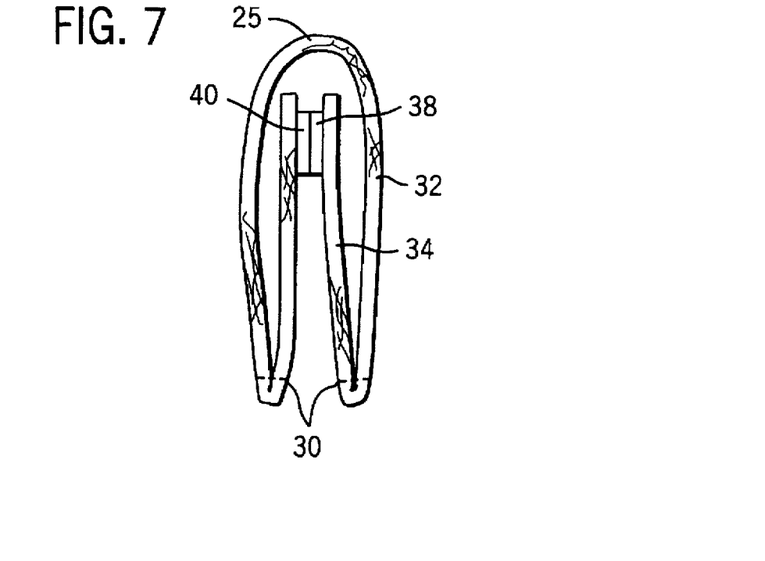
FIG. 7 is a partial sectional view of the case along line A—A of FIG. 1 in a retainer configuration.
Figure 8:
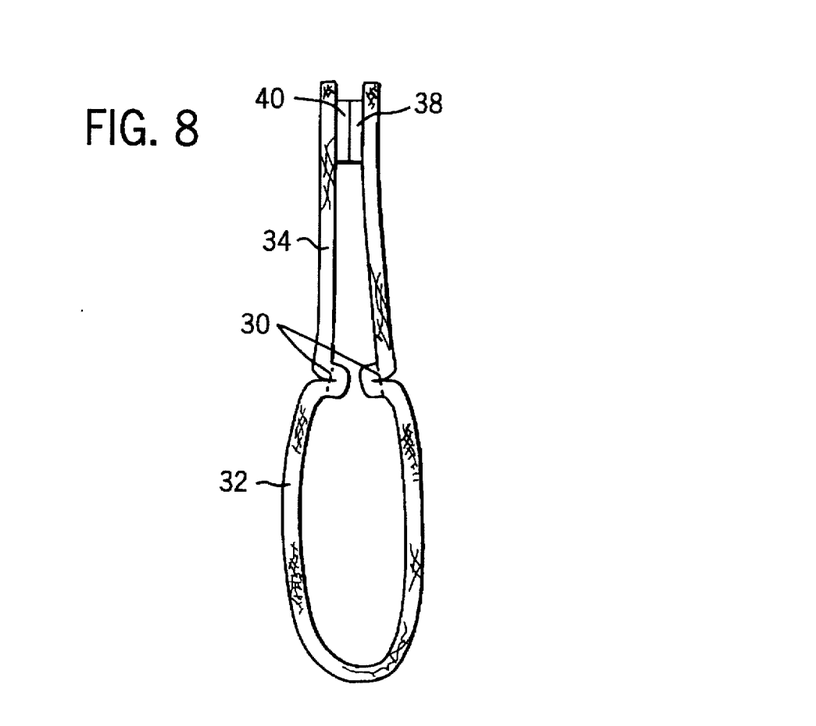
FIG. 8 is a partial sectional view of the case along line B—B of FIG. 6 in a cover configuration.
Figure 9:
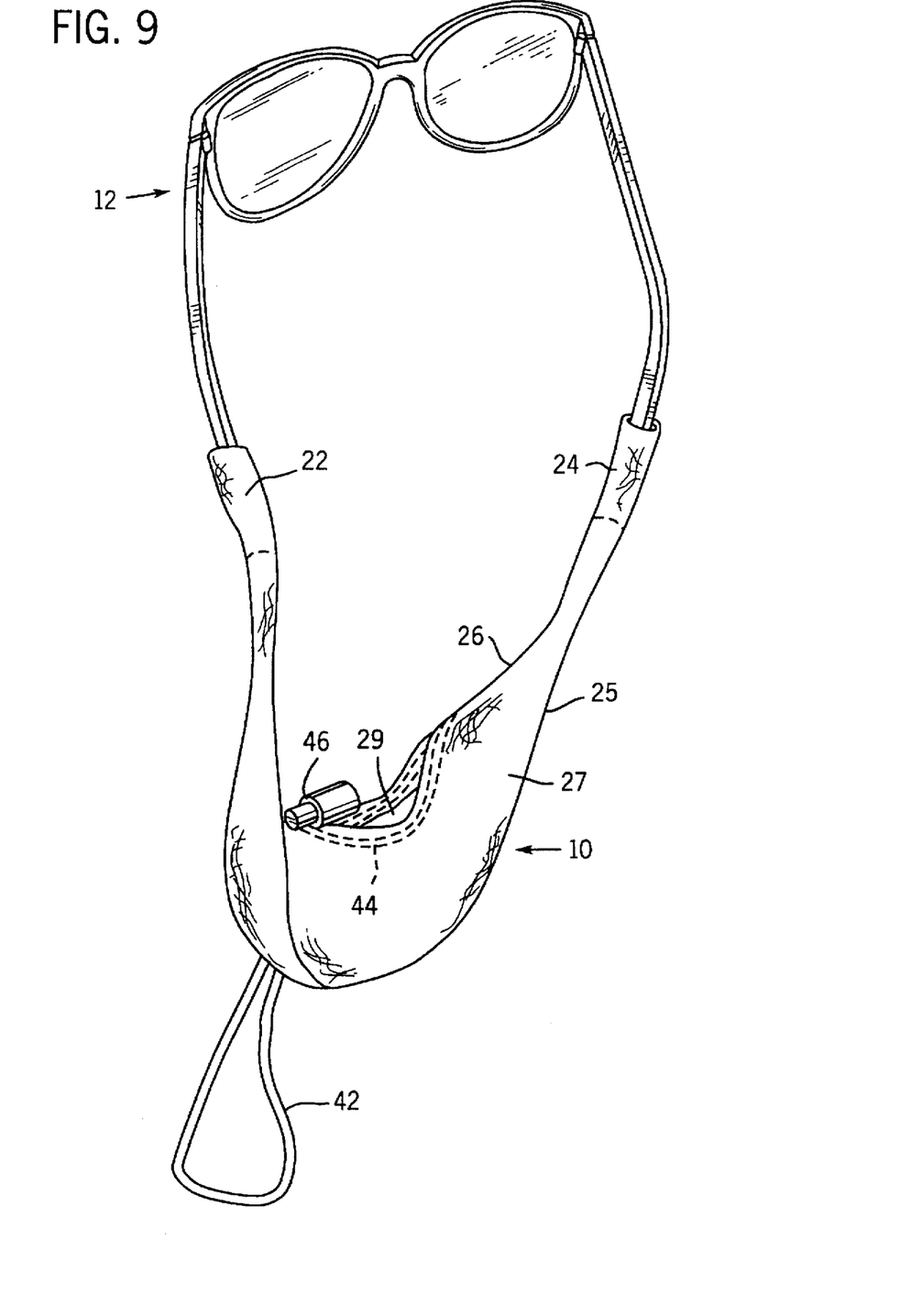
FIG. 9 is a perspective view of a second embodiment of a combination retainer and case.

FIGS. 7 and 8 illustrate, in cross section, the orientation of the portions of case 10 described above in their retainer and cover configurations. Eyeglasses 12 are not shown in FIGS. 7 and 8 for the sake of clarity. As shown in FIG. 7, in the retainer configuration, case 10 is folded or collapsed into a relatively narrow band or strip by nesting second portion 34 of pouch 27 within first portion 32, with biasing hem 30 located at the bottom of the band. Closure members may be mated in this configuration to prevent second portion 34 from falling or unfolding from first portion 32. As shown in FIG. 8, when case 10 is unfolded and inverted into its cover configuration, biasing hem 30 is located within pouch 27 along with retainer ends 22, 24 (not shown). It should be noted that, due to the unfolding of pouch 27 (as shown in FIG. 3) and its inversion (as shown in FIGS. 4 and 5), mating closure members 38 and 40 are once again located in mutually facing relation in the cover configuration shown in FIG. 8. Thus, closure members 38, 40 serve both to retain pouch 27 in its collapsed position (FIG. 7) as well as to close pouch 27 and positively hold the eyeglasses within the pouch in the expanded and inverted position (FIG. 8).

A second embodiment of case 10 is shown in FIGS. 9 through 12. In this embodiment, a pouch 27 is formed of the desired fabric by folding and sewing. The pouch 27 has an opening 29 along one edge while two elongate ends 22 and 24 are provided, each containing an elastomeric tube adapted to fit over, surround and releasably secure pouch 27 to glasses 12. Such tubular connections are well-known, in and of themselves. A cord 42 is provided about opening 29 and is free to move within a seam 44 (see FIG. 10) so that opening 29 may be reduced in size by pulling on cord 42. A cord lock 46, or similar clamping device or a type well known in the art, may be provided over cord 42 to facilitate keeping opening 32 at a desired size.

Figure 10:
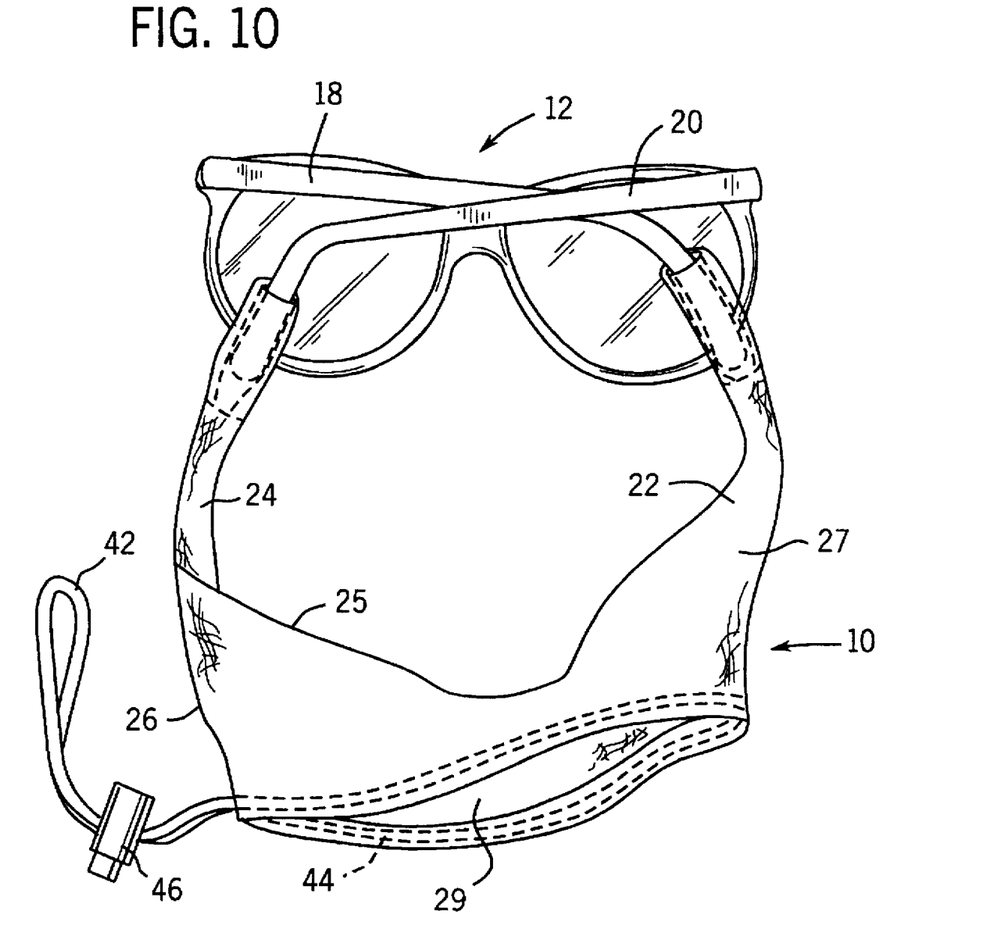
FIGS. 10 through 12 are perspective views of the case shown in FIG. 9, illustrating how the eyeglasses are inserted therein.
Figure 11:
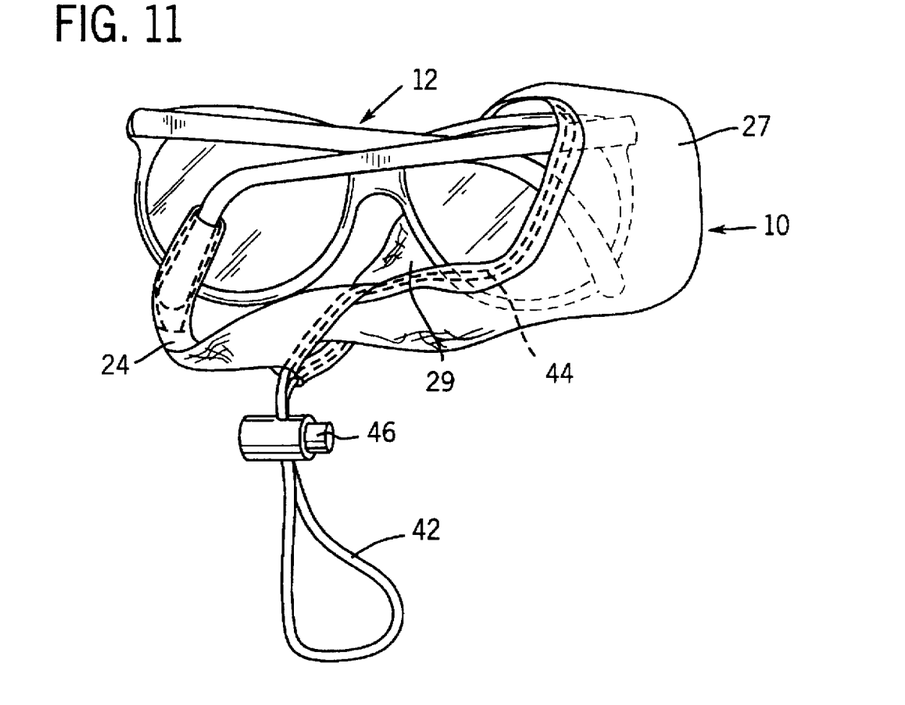
Figure 12:
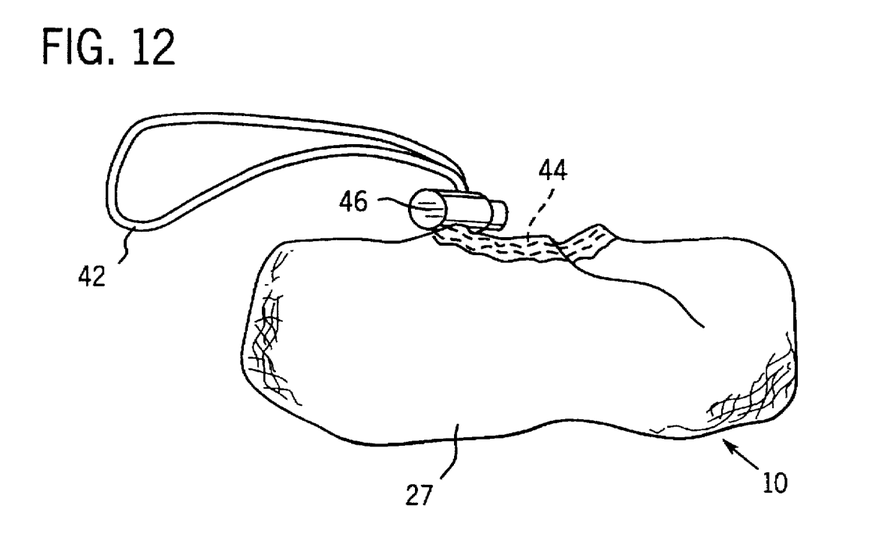

FIGS. 10 through 12 illustrate how eyeglasses 12 are progressively inserted into pouch 27. As shown in FIG. 10, eyeglasses 12 are first folded, effectively flipping pouch 27 which remains coupled to stems 18 and 20. Lock 46 is then drawn away from pouch 27 to permit opening 29 to be expanded to receive the glasses. The eyeglasses 12 are then progressively inserted into pouch 27 through opening 29 as shown in FIG. 11. It should be noted that in this embodiment, as eyeglasses 12 are inserted into pouch 27, the pouch is effectively wrapped around the eyeglasses and progressively turned inside-out with the eyeglasses contacting the previously outwardly-facing surface of the pouch. Once the eyeglasses are completely inserted into pouch 27, pouch 27 is closed by drawing lock 46 along cord 42 and into contact with pouch 27 to effectively close opening 29. It should be mentioned that alternative closure devices may be used with the pouch, particularly in the embodiment illustrated in FIGS. 9 through 12. Such closure devices might include snaps, buttons, zippers and the like.

While the present invention has been illustrated in connection with four separate embodiments, several features of the invention are common to the embodiments, such as the ability to insert the glasses into the retainer without detachment of the retainer cords or tubes.

I claim:

1. A device for retaining and covering eyeglasses of the type having a frame for mounting lenses and a pair of stems coupled to the frame for holding the eyeglasses on the head of a user, the device comprising:

a flexible pouch having an aperture along a first edge for receiving the eyeglasses, the pouch including first and second portions, the first portion bordering a closed second edge and the second portion extending from the first portion and surrounding the aperture, the second portion being collapsible into the first portion to form a relatively narrow retainer configuration and removable from the first portion to form an expanded cover configuration for lodging the eyeglasses;

a pair of retaining extensions for coupling to the stems of the eyeglasses; and closure members disposed on the second portion of the pouch, the closure members mating to retain the second portion within the first portion when the device is placed in the retainer configuration and to positively close the aperture to hold the eyeglasses within the pouch when the device is placed in the cover configuration.

2. The device of claim 1, wherein the closure members are mating snaps.

3. The device of claim 1, wherein the pouch includes a biasing hem in a region joining the first and second portions, the biasing hem urging the second member into the retainer configuration.

4. The device of claim 1, wherein the pouch and retainer extensions are formed of a single piece of fabric folded along the second edge.

5. The device of claim 1, wherein the pouch includes an elastic border surrounding the aperture, the border constricting the pouch around the aperture.

* * * * *